(12) United States Patent
Kolb et al.

(10) Patent No.: US 8,247,495 B2
(45) Date of Patent: Aug. 21, 2012

(54) ELASTOMERIC POLYMER BLENDS AND PROCESSES FOR THEIR PRODUCTION

(75) Inventors: Rainer Kolb, Kingwood, TX (US); John W. Chu, Neshanic Station, NJ (US); Gabor Kiss, Hampton, NJ (US); Robert P. Reynolds, Jr., Clinton, NJ (US); Jean-Roch Schauder, Wavre (BE); Thomas T. Sun, Clinton, NJ (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 13/015,364

(22) Filed: Jan. 27, 2011

(65) Prior Publication Data

US 2011/0207888 A1    Aug. 25, 2011

Related U.S. Application Data

(60) Provisional application No. 61/305,987, filed on Feb. 19, 2010.

(51) Int. Cl.
*C08F 8/00* (2006.01)
*C08L 23/04* (2006.01)
*C08L 23/10* (2006.01)

(52) U.S. Cl. ......................... 525/191; 525/240

(58) Field of Classification Search .................. 525/191, 525/240

See application file for complete search history.

(56) References Cited

U.S. PATENT DOCUMENTS

| 7,256,240 | B1 | 8/2007 | Jiang |
| 7,459,500 | B2 * | 12/2008 | Tau et al. ....................... 525/191 |
| 7,601,666 | B2 | 10/2009 | Rix et al. |
| 2004/0024146 | A1 | 2/2004 | Friedersdorf |
| 2004/0236042 | A1 | 11/2004 | Datta et al. |
| 2006/0058463 | A1 | 3/2006 | Fuchs et al. |
| 2006/0135699 | A1 | 6/2006 | Li et al. |
| 2006/0167185 | A1 * | 7/2006 | Fuchs et al. .................... 525/240 |
| 2006/0183861 | A1 | 8/2006 | Harrington et al. |
| 2007/0015877 | A1 | 1/2007 | Burkhardt et al. |
| 2009/0163642 | A1 | 6/2009 | Kiss et al. |

FOREIGN PATENT DOCUMENTS

WO    WO 2004/046214    6/2004

OTHER PUBLICATIONS

Sun et al., "*Effect of Short Chain Branching on the Coil Dimensions of Polyolefins in Dilute Solution*", Macromolecules, 2001, vol. 34, pp. 6812-6820.
Sun et al., "*A Study of the Separation Principle in Size Exclusion Chromatography*", Macromolecules, 2004, vol. 37, pp. 4304-4312.
Wunderlich, "*ThermalAnalysis*", AcademicPress, 1990, pp. 418.

* cited by examiner

Primary Examiner — Nathan M Nutter
(74) Attorney, Agent, or Firm — Hsin Lin; Leandro Arechederra, III

(57) ABSTRACT

Elastomeric polymer blends and processes for their production are described. Specifically, the polymer blends comprise a first polymer and a second polymer, where the first polymer comprises from about 70 wt % to about 90 wt % units derived from propylene and from about 10 wt % to about 30 wt % units derived from ethylene and/or a $C_4$-$C_{10}$ alpha-olefin, and the second polymer comprises from about 88 wt % to about 98 wt % units derived from propylene and from about 2 wt % to about 12 wt % units derived from ethylene and/or a $C_4$-$C_{10}$ alpha-olefin. The elastomeric polymer blends are further characterized by having two or more of the following properties: an overall propylene content of between about 75 wt % and about 90 wt %, a melting point between about 110° C. and about 145° C., a Vicat softening point greater than about 45° C., a tensile stress at 300% strain of less than about 500 psi (3447 kPa), as determined by a stress strain test according to ASTM D412, or an average maximum force for pellet separation of less than about 10 N in an accelerated storage stability test. The polymer blends are produced in a dual reactor process, in which the first polymer and the second polymer are prepared using differing catalyst systems.

20 Claims, 1 Drawing Sheet

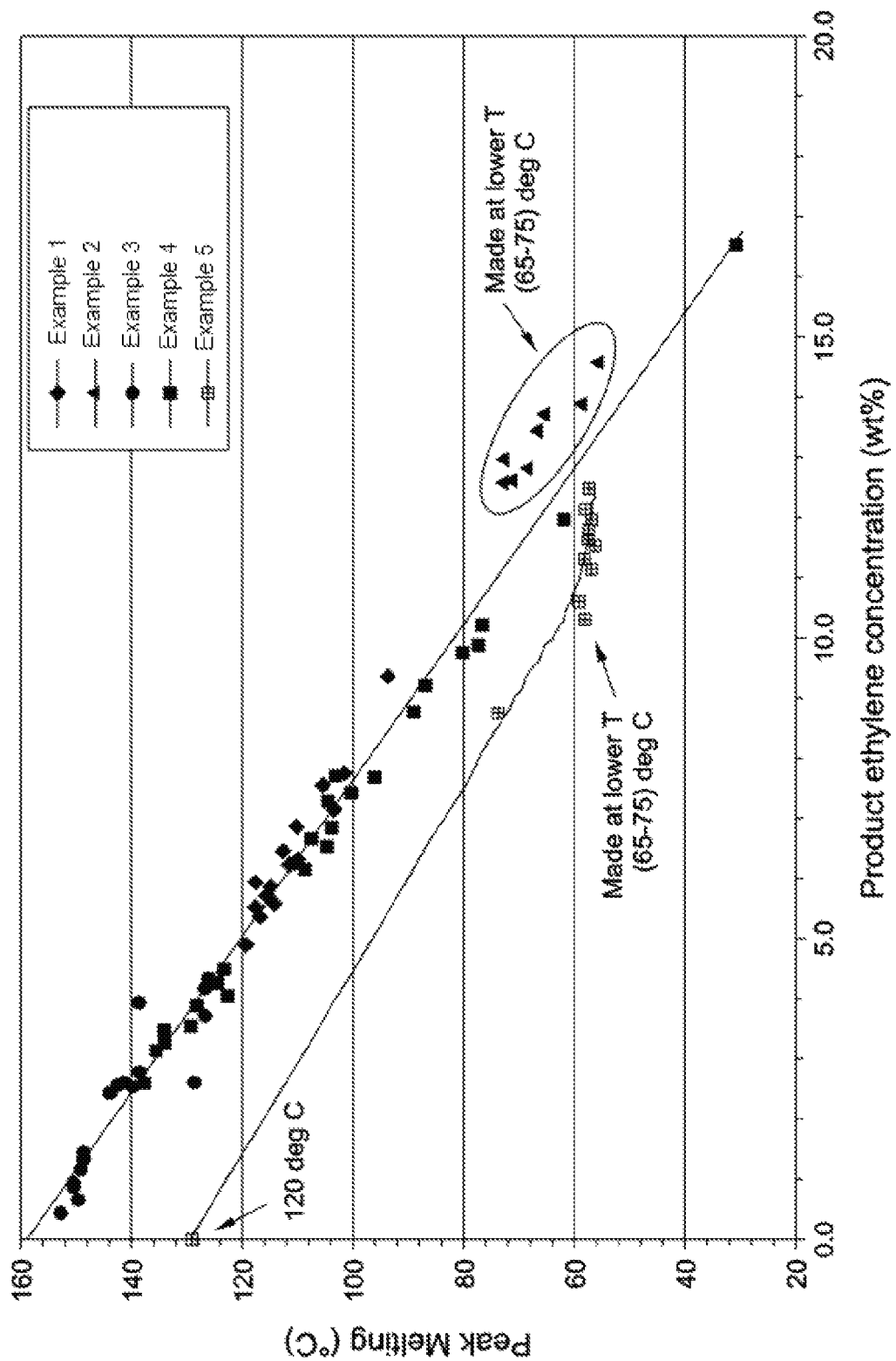

ELASTOMERIC POLYMER BLENDS AND PROCESSES FOR THEIR PRODUCTION

CROSS REFERENCE TO RELATED APPLICATIONS

This application claims priority to provisional U.S. patent application Ser. No. 61/305,987, filed Feb. 19, 2010; and is related to U.S. Ser. No. 12/317,062, filed Dec. 18, 2008, which claims priority from provisional U.S. patent application Ser. No. 60/008,494, filed Dec. 20, 2007, each of which is herein incorporated by reference.

FIELD OF THE INVENTION

The embodiments herein relate to elastomeric blends and processes to make such elastomeric blends, and more particularly, to blends of elastomers that a propylene-based elastomers.

BACKGROUND OF THE INVENTION

Polyolefin polymers and polymer blends are known for their versatility and applicability in a wide variety of uses. In particular, many polyolefin polymers, including copolymers of propylene with other α-olefins such as ethylene, are well suited for use in applications requiring good stretchability, elasticity, and strength. Such polymers often comprise a blend of two or more propylene copolymers, and may be manufactured by mechanically blending two or more copolymers, or by in-line reactor blending of the copolymers.

Many polyolefin blends known in the prior art are formed into pellets for intermediate storage purposes before being shaped into articles such as fibers, films, nonwovens, extruded coatings, and molded articles. Some of these compositions, however, are known to exhibit poor pellet stability over extended periods of time, leading to agglomeration of pellets and resulting in poor pourability and flowability of the pellets. While the formation of in-line reactor blends of such polyolefin copolymers has been shown to improve stability properties of the polymer pellets, such pellets still have a tendency to agglomerate during shipping and long-term storage, thus presenting processing issues where free-flowing pellets are required. As a result, many known polyolefin blend pellets are dusted, such as with a low density polyethylene dust, to prevent agglomeration. The use of such dusts may be problematic for certain applications, however, because they may increase gel levels in films, be unacceptable for use in food contact applications, or create housekeeping issues because of increased dust in the plant environment. Further, the typically low melting points of such known polymer blends often lead to flattening or other deformation of polymer pellets during long-term storage, which also negatively affects the ability of the polymer pellets to be free-flowing.

Thus, there is still a need for polyolefin polymer blends having increased melting points while maintaining desirable stretchability, elasticity, and strength properties. Additionally, there is a need for pellets formed from such improved polymer blends which have long-term pellet stability and are free-flowing without being dusted.

It is therefore an object of the embodiments described herein to provide processes for forming polyolefin polymer blends and catalyst systems for use in those processes, where the resulting polymers have acceptable mechanical properties and long-term pellet stability. Ideally, such catalyst system should also exhibit high catalytic activity under (propylene) polymerization conditions. It is further an object of the embodiments described herein to provide polymer compositions made from the processes and catalyst systems described herein. These polymer compositions display advantageously narrow composition distributions and high melting points in comparison to previously known polymers having the same comonomer content. As a result, the polymers described herein exhibit improved properties such as pellet stability, elasticity, and other mechanical properties desired for a variety of end use applications.

SUMMARY OF THE INVENTION

The embodiments described herein are directed to polymer blends and processes for their production. In one or more embodiments, the embodiments described herein is directed to elastomeric polymer compositions comprising a polymer blend comprising a first polymer and a second polymer, where the first polymer comprises from about 70 to about 90 wt % units derived from propylene and from about 10 to about 30 wt % units derived from ethylene and/or a $C_4$-$C_{10}$ alpha-olefin, and the second polymer comprises from about 88 to about 98 wt % units derived from propylene and from about 2 to about 12 wt % units derived from ethylene and/or a $C_4$-$C_{10}$ alpha-olefin. These elastomeric polymer compositions are further characterized by two or more of the following properties: an overall propylene content between about 75 wt % and about 90 wt %; a melting point between about 110° C. and about 145° C.; a Vicat softening point greater than about 45° C.; a tensile stress at 300% strain of less than about 500 psi (3447 kPa) (as determined by a stress strain test according to ASTM D412), or an average maximum force for pellet separation of less than about 10 N in an accelerated storage stability test.

In further embodiments, the embodiments described herein are directed to processes for the production of elastomeric polymer compositions comprising polymerizing monomers to produce a polymer solution comprising a first polymer in a first reactor, polymerizing monomers to produce a polymer solution comprising a second polymer in a second reactor, combining the first polymer solution with the second polymer solution to produce a polymer blend solution, and processing the polymer blend solution to produce an elastomeric polymer composition. In such processes, the first polymer comprises from about 70 wt % to about 90 wt % units derived from propylene and from about 10 wt % to about 30 wt % units derived from ethylene and/or a $C_4$-$C_{10}$ alpha-olefin, the second polymer comprises from about 88 wt % to about 98 wt % units derived from propylene and from about 2 wt % to about 12 wt % units derived from ethylene and/or a $C_4$-$C_{10}$ alpha-olefin, and the elastomeric polymer composition is characterized by two or more of the following properties: an overall propylene content of between about 75 wt % and about 90 wt %; a melting point between about 110° C. and about 145° C.; a Vicat softening point greater than about 45° C.; a tensile stress at 300% strain of less than about 500 psi (3447 kPa) (as determined by a stress strain test according to ASTM D412), or an average maximum force for pellet separation of less than about 10 N in an accelerated storage stability test. In these or other embodiments, the catalysts used in the first and second reactors are different from one another.

BRIEF DESCRIPTION OF THE FIGURE

FIG. 1 depicts melting temperature as a function of ethylene content for a series of polymer blends prepared using various catalyst systems.

DETAILED DESCRIPTION OF THE INVENTION

The embodiments described herein is directed to polyolefin polymer blends and processes for their production. More particularly, embodiments of the invention include blends of a first propylene-based polymer formed in a first reactor with a second propylene-based polymer produced in a second reactor. The polymer blends described herein exhibit improved pellet stability when compared to similar blends prepared in a single reactor, and have exceptional mechanical and elastic properties. Further, the polymer blends described herein have higher melting points than similar blends prepared in earlier dual reactor processes, thus providing an improvement in pellet stability properties even over similar dual reactor processes. The polymer blends, processes for their production, and catalyst systems used in those processes are described in greater detail below.

Polymers Comprising the Blend

In the preferred embodiment, a first polymer prepared in a first reactor and a second polymer prepared in a second reactor. The first and second polymers are typically olefin-based polymers, and in some embodiments each is a propylene-based homopolymer or copolymer. As used herein, the term "copolymer" is intended to mean a material which is prepared by copolymerizing at least two different comonomer types, including comonomers derived from α-olefins and dienes. One or more other different comonomer types may also be included in the copolymer such that the copolymer definition includes terpolymers as well as copolymers comprising four or more different comonomer types. The term "monomer" or "comonomer" as used herein can refer to the monomer used to form the polymer, i.e., the unreacted chemical compound in the form prior to polymerization, and can also refer to the monomer after it has been incorporated into the polymer, also referred to herein as a "[monomer]-derived unit." Different monomers are discussed herein, including propylene monomers and ethylene monomers.

In some embodiments of the embodiments described herein, the first and second polymers are each a copolymer of propylene and one or more comonomers. The comonomers may be linear or branched. In one or more embodiments, linear comonomers may include ethylene or $C_4$-$C_{10}$ α-olefins, including but not limited to 1-butene, 1-pentene, 1-hexene, 1-octene, and 1-decene. Branched comonomers may include 4-methyl-1-pentene, 3-methyl-1-pentene, and 3,5,5-trimethyl-1-hexene. In one or more embodiments, the comonomer can include styrene.

In some embodiments, the first and second polymers are each a copolymer of propylene and ethylene (and may comprise other comonomers as well). For example, the first and second polymers may be the same or different, and may each comprise from about 60 wt % to about 98 wt % units derived from propylene and from about 2 wt % to about 40 wt % units derived from ethylene. In some embodiments, the first polymer may comprise from about 5 wt % to about 40 wt % ethylene-derived units, or from about 8 wt % to about 35 wt % ethylene-derived units, or from about 10 wt % to about 30 wt % ethylene-derived units. In the same or other embodiments, the second polymer may comprise from about 2 wt % to about 12 wt % ethylene-derived units, or from about 3 wt % to about 8 wt % ethylene-derived units. In one embodiment of the embodiments described herein, the first polymer has a greater ethylene content than the second polymer. For example, the first polymer may comprise at least 5 wt %, or at least 10 wt %, or at least 15 wt %, or at least 20 wt % more ethylene-derived units than the second polymer.

In one or more embodiments herein, the second polymer may comprise lower amounts of ethylene, such that the second polymer may be a random copolymer of ethylene and propylene (RCP). RCPs and their typical properties are well known in the art. Exemplary RCPs typically comprise from about 2 to about 8 wt % comonomer, or from about 2.5 to about 5 wt % comonomer. In one or more embodiments, the RCP comonomer is ethylene.

Optionally, the first and second polymers may also include one or more dienes. The term "diene" is defined as a hydrocarbon compound that has two unsaturation sites, i.e., a compound having two double bonds connecting carbon atoms. Depending on the context, the term "diene" in this patent refers broadly to either a diene monomer prior to polymerization, e.g., forming part of the polymerization medium, or a diene monomer after polymerization has begun (also referred to as a diene monomer unit or a diene-derived unit). Exemplary dienes suitable for use in the embodiments described herein include, but are not limited to, butadiene, pentadiene, hexadiene (e.g., 1,4-hexadiene), heptadiene (e.g., 1,6-heptadiene), octadiene (e.g., 1,7-octadiene), nonadiene (e.g., 1,8-nonadiene), decadiene (e.g., 1,9-decadiene), undecadiene (e.g., 1,10-undecadiene), dodecadiene (e.g., 1,11-dodecadiene), tridecadiene (e.g., 1,12-tridecadiene), tetradecadiene (e.g., 1,13-tetradecadiene), pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, and polybutadienes having a molecular weight (Mw) of less than 1000 g/mol. Examples of straight chain acyclic dienes include, but are not limited to, 1,4-hexadiene and 1,6-octadiene. Examples of branched chain acyclic dienes include, but are not limited to, 5-methyl-1,4-hexadiene, 3,7-dimethyl-1,6-octadiene, and 3,7-dimethyl-1,7-octadiene. Examples of single ring alicyclic dienes include, but are not limited to, 1,4-cyclohexadiene, 1,5-cyclooctadiene, and 1,7-cyclododecadiene. Examples of multi-ring alicyclic fused and bridged ring dienes include, but are not limited to, tetrahydroindene; norbornadiene; methyltetrahydroindene; dicyclopentadiene; bicyclo(2.2.1)hepta-2,5-diene; and alkenyl-, alkylidene-, cycloalkenyl-, and cylcoalkylidene norbornenes [including, e.g., 5-methylene-2-norbornene, 5-ethylidene-2-norbornene, 5-propenyl-2-norbornene, 5-isopropylidene-2-norbornene, 5-(4-cyclopentenyl)-2-norbornene, 5-cyclohexylidene-2-norbornene, and 5-vinyl-2-norbornene]. Examples of cycloalkenyl-substituted alkenes include, but are not limited to, vinyl cyclohexene, allyl cyclohexene, vinylcyclooctene, 4-vinylcyclohexene, allyl cyclodecene, vinylcyclododecene, and tetracyclododecadiene. In some embodiments of the embodiments described herein, the diene is selected from 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopentadiene (DCPD), and combinations thereof. In one or more embodiments, the diene is ENB.

When one or more dienes are included, the first and second polymers may comprise the same or different amounts of diene-derived units. In some embodiments, the first and second polymers each comprise from 0.05 wt % to about 6 wt % diene-derived units. In further embodiments, the first polymer comprises from about 0.5 wt % to about 5.0 wt % diene-derived units, or from about 1.0 wt % to about 3.0 wt % diene-derived units. In the same or different embodiments, the second polymer comprises from about 0.1 wt % to about 1.0 wt % diene-derived units.

The first and second polymers may have a weight average molecular weight (Mw) of 5,000,000 g/mole or less, a number average molecular weight (Mn) of about 3,000,000 g/mole or less, a z-average molecular weight (Mz) of about 10,000,000 g/mole or less, and a g' index of 0.95 or greater measured at the weight average molecular weight (Mw) of the polymer using isotactic polypropylene as the baseline, all of which can be determined by gel permeation chromatography (GPC). Molecular weights may be measured using conventional GPC with a differential refractive index detector (DRI) or a Low Angle Laser Light Scattering (LALLS) detector. Lower moments of the molecular weight, such as Mn, are obtained using DRI. Higher moments, such as Mw and Mz, are obtained using DRI.

In one or more embodiments, the first and second polymers have the same or different Mw, and each have an Mw of about 5,000 to about 5,000,000 g/mole, or an Mw of about 10,000 to about 1,000,000, or an Mw of about 20,000 to about 500,000, or an Mw of about 50,000 to about 400,000, where Mw is determined as described herein.

In one or more embodiments, the first and second polymers may have the same or different Mn, and each have an Mn of about 2,500 to about 2,500,000 g/mole, or an Mn of about 5,000 to about 500,000, or an Mn of about 10,000 to about 250,000, or an Mn of about 25,000 to about 200,000, where Mn is determined as described herein.

In one or more embodiments, the first and second polymers have the same or different Mz, and each have an Mz of about 10,000 to about 7,000,000 g/mole, or an Mz of about 50,000 to about 1,000,000, or an Mz of about 80,000 to about 700,000, or an Mz of about 100,000 to about 500,000, where Mz is determined as described herein.

The molecular weight distribution (MWD=(Mw/Mn)), sometimes referred to as a "polydispersity index" (PDI), of the first and second polymers may be the same or different, and may be from about 1.5 to 40. In some embodiments the MWD of the first polymer or the second polymer or both can have an upper limit of 40, or 20, or 10, or 5, or 4.5, and a lower limit of 1.5, or 1.8, or 2.0. In one or more embodiments, the MWD of the first polymer or the second polymer or both is about 1.8 to 5. Techniques for determining Mn, Mw, Mz, and MWD are given in 34(19) MACROMOLECULES, 6812-6820 (2001), and 37(11) MACROMOLECULES, 4304-4312 (2004), both of which are incorporated herein by reference for purposes of U.S. practice.

In one or more embodiments, the first and second polymers may have a g' index value of 0.95 or greater, or at least 0.97, or at least 0.99, wherein g' is measured at the Mw of the polymer using the intrinsic viscosity of isotactic polypropylene as the baseline. For use herein, the g' index is defined as:

$$g' = \frac{\eta_b}{\eta_l}$$

where $\eta_b$ is the intrinsic viscosity of the polymer and $\eta_l$ is the intrinsic viscosity of a linear polymer of the same viscosity-averaged molecular weight ($M_v$) as the polymer. $\eta_l = KM_v^\alpha$, K and $\alpha$ are measured values for linear polymers and should be obtained on the same instrument as the one used for the g' index measurement.

In one or more embodiments, the first and second polymers may have the same or different density, which may be from about 0.85 g/cm$^3$ to about 0.92 g/cm$^3$, or from about 0.86 g/cm$^3$ to 0.90 g/cm$^3$, or from about 0.87 g/cm$^3$ to about 0.89 g/cm$^3$ at room temperature as measured per the ASTM D-1505 test method.

In one or more embodiments, the first and second polymer can have a melt flow rate (MFR, 2.16 kg weight @ 230° C.) greater than or equal to 0.2 g/10 min as measured according to the ASTM D-1238(A) test method. The MFR of the first and second polymers can be the same or different. In some embodiments, the MFR (2.16 kg weight @ 230° C.) of the first polymer or the second polymer or both is from about 0.5 g/10 min to about 2000 g/10 min, or from about 1 g/10 min to about 1500 g/10 min. In some embodiments, the first polymer has an MFR of from about 0.5 g/10 min to about 100 g/10 min, or from about 2 g/10 min to about 30 g/10 min, or from about 3 g/10 min to about 20 g/10 min. In the same or other embodiments, the second polymer has an MFR of from about 0.5 to about 2000 g/10 min, or from about 1 to about 1600 g/10 min, or from about 5 to about 1200 g/10 min.

The first and/or second polymers may have a Mooney viscosity, ML (1+4) @ 125° C., as determined according to ASTM D1646, of less than 100, or less than 75, or less than 60, or less than 30. The Mooney viscosity of the first and second polymers may be the same or different.

In one or more embodiments, the first polymer or second polymer or both may have a heat of fusion (Hf) determined according to the DSC procedure described later, which is greater than or equal to about 0.5 Joules per gram (J/g), and is less than or equal to about 80 J/g, or less than or equal to about 75 J/g, or less than or equal to about 70 J/g, or less than or equal to about 60 J/g, or less than or equal to about 50 J/g. The first polymer or second polymer or both may also have a heat of fusion that is greater than or equal to about 1 J/g, or greater than or equal to about 5 J/g. In another embodiment, the first polymer or second polymer or both may have a Hf which is from about 0.5 J/g to about 75 J/g, or from about 1 J/g to about 75 J/g, or from about 3 J/g to about 35 J/g. In some embodiments, the polymers and compositions can be characterized in terms of both their melting points (Tm) and Hf, which properties can be influenced by the presence of comonomers or steric irregularities that hinder the formation of crystallites by the polymer chains. In one or more embodiments, the Hf of the first polymer or the second polymer or both ranges from a lower limit of 1.0 J/g, or 1.5 J/g, or 3.0 J/g, or 4.0 J/g, or 6.0 J/g, or 7.0 J/g, to an upper limit of 30 J/g, or 35 J/g, or 40 J/g, or 50 J/g, or 60 J/g or 70 J/g, or 75 J/g, or 80 J/g. The Hf of the first and second polymers may be the same or different.

The crystallinity of the first and second polymers can also be expressed in terms of percentage of crystallinity (i.e., % crystallinity). In one or more embodiments, the first polymer and second polymers have the same or different crystallinity, and the % crystallinity of one or both of the polymers may be from 0.5% to 40%, or from 1% to 30%, or from 5% to 25%, where % crystallinity is determined according to the DSC procedure described below. For reference purposes, the thermal energy for the highest order of polypropylene is estimated at 189 J/g (i.e., 100% crystallinity is equal to 209 J/g).

In addition to this level of crystallinity, the first and second polymers may have a single broad melting transition or show a first broad melting transition and a narrower second melting transition at higher temperatures. For purposes herein, the maximum of the highest temperature peak is considered the melting point of the polymer. A "peak" in this context is defined as a change in the general slope of the DSC curve (heat flow versus temperature) from positive to negative forming a maximum without a shift in the baseline where the DSC curve is plotted so that an endothermic reaction would be shown with a positive peak.

The first and second polymers may have the same or different melting point and, in some embodiments, one or both of the first and second polymers has a melting point (measured by DSC) of equal to or less than 110° C., or less than 100° C., or less than 90° C., or less than or equal to 80° C., or less than or equal to 75° C., or from about 25° C. to about 80° C., or from about 25° C. to about 75° C., or from about 30° C. to about 65° C. In these or other embodiments, the melting point of the second polymer is greater than the melting point of the first polymer, and may be greater than about 105° C., or greater than about 110° C., or greater than about 115° C.

Phase transitions were measured on heating and cooling the sample from the solid state and melt, respectively, using DSC. The crystallization ($T_c$) and melting temperature ($T_m$) measurements were conducted using a TA Instrument MDSC 2920 or Q1000 Tzero-DSC and data analyzed using the standard analysis software provided by the vendor. Typically, 3 to 10 mg of polymer was placed in an aluminum pan and loaded into the instrument at room temperature. The sample was cooled to either −130° C. or −70° C. and then heated to 210° C. at a heating rate of 10° C./min to evaluate the glass transition and melting behavior for the as-received polymers. Then the sample was held at 210° C. for 5 min to destroy its thermal history. Crystallization behavior was evaluated by cooling the sample from the melt to sub-ambient temperature at a cooling rate of 10° C./min. The sample was held at the low temperature for 10 min to fully equilibrate in the solid state and achieve a steady state. Second heating data were measured by heating this melt-crystallized sample at 10° C./min. The second heating data thus provided phase behavior information for samples crystallized under controlled thermal history. The endothermic melting transition (first and second melt) and exothermic crystallization transition were analyzed for onset of transition and peak temperatures. The melting temperatures were the peak melting temperatures from the second melt, unless otherwise indicated. For polymers displaying multiple peaks, the higher melting peak temperature was reported. Glass transition temperature values were defined by the temperature at which the heat capacity change ($\Delta C_p$) is half of its total value (step-change between equilibrium liquid to equilibrium solid state) at which point half of the sample was devitrified. Areas under the DSC curve were used to determine the Hf, which was also used to calculate the degree of crystallinity. 8.7 kJ/mol and 4.1 kJ/mol were taken as the equilibrium heats of fusion for the 100% crystalline polypropylene (single crystal measurements from B. Wunderlich, Thermal Analysis, Academic Press, New York, 1990, p. 418). The percent propylene values were calculated by using the following formula:

Propylene crystallinity=[area under the curve(J/g)× 42g/mol/8700(J/mol]*100%

The first and/or second polymers may further have a triad tacticity of three propylene units, as measured by $^{13}$C NMR, of 75% or greater, 80% or greater, 82% or greater, 85% or greater, or 90% or greater. In some embodiments, the triad tacticity of the first polymer, the second polymer, or both ranges from about 50 to about 99%, or from about 60 to about 99%, or from about 75 to about 99%, or from about 80 to about 99%, or from about 60 to about 97%. Triad tacticity is determined by the methods described in U.S. Patent Application Publication No. 2004/0236042, which is incorporated herein by reference.

Preparation of the Polymer Blend

Particles made from polymers of the type described herein are generally soft to the touch and may be tacky. While these properties are desirable for many end-use applications, the polymers may present storage and handling problems. For example, polymer particles, commonly referred to in the industry as pellets, made from these polymers have a tendency to agglomerate (or exhibit restricted flow), particularly after long-term warehouse storage at ambient temperatures. Often, polymer pellets are dusted in an effort to reduce or eliminate flow or agglomeration issues. The use of such dust is undesirable, however, because it may present issues such as increased gel formation in polymer films, unacceptability in food contact applications, or health and housekeeping hazards due to increased dust in the air and on surfaces in plant environments.

It has been discovered that agglomeration of polymer pellets results from deformation of the polymer pellets during storage and handling of the pellets during the first few hours or days following production of the pellets. Specifically, upon production, polymer pellets generally have shapes that are spherical, cylindrical, disk-like, or other shapes in which the outer surface of the pellets are curved as opposed to flat surfaces. Generally, polymer pellets are free-flowing, as the curved surfaces of the pellets have minimal contact surface and thus slide freely past each other. However, it has been discovered that under certain circumstances, the curved pellet surfaces may become flattened during storage as a result of the pellets pressing against each other, especially when stored in containers with significant vertical dimensions. When this flattening of the surfaces of the polymer pellets occurs, contact area increases significantly, reducing the ability of the pellet surfaces to slide past each other, leading to agglomeration or restricted flow of the particles in subsequent processing steps.

The resistance of a pellet to flattening of its surfaces is related to the crystal size and the crystallinity of the polymers and may be determined by measuring, among other characteristics, the hardness of the polymer pellets. Generally, it has been determined, in one embodiment, that a Shore A Hardness (ASTM 2240) of at least 50 provides pellets with a reduced tendency to agglomerate. In another embodiment, a Shore A Hardness of at least 55 provides pellets with a reduced tendency to agglomerate. In a further embodiment, a Shore A Hardness of at least 60 provides pellets with a reduced tendency to agglomerate. While pellets made from many low crystallinity polymers may achieve this level of hardness following production, it may take days before this level of hardness is attained as the pellets crystallize slowly over time, particularly for propylene-based polymers and copolymers where crystallization kinetics are known to be slower than ethylene-based polymers and copolymers. The processes described herein speed the rate of crystallization of the polymer pellets to provide a hardness, in a short period of time after production, which enables the pellets to flow freely, even after long storage periods.

In certain embodiments of the processes and blends described herein, a first polymer is blended with a second polymer to produce a polymer blend that, when processed into pellet forms, will achieve a state of crystallization sufficient to provide a Shore A Hardness of at least 50, or at least 52, or at least 55, or at least 57, or at least 60, in a relatively short period of time (i.e., within 40 minutes after initial cooling of the pellets, or within 30 minutes, or within 20 minutes, or within 15 minutes), as compared to pellets produced from the first polymer alone.

Further, increasing the melting temperature of the polymer blend also serves to prevent flattening of the polymer pellets under storage conditions. In certain embodiments of the processes and blends described herein, a first polymer is blended with a second polymer to produce a polymer blend that has a melting temperature greater than 100° C., or greater than 110° C., or greater than 115° C., or greater than 120° C. In the same or other embodiments, the melting temperature of the polymer blend is between about 110° C. and about 145° C., or between about 115° C. and about 140° C., or between about 120° C. and about 135° C.

For purposes of this disclosure, the first polymer, as described above, may generally be considered a low crystallinity polymer, while the second polymer, as described above, may generally be considered a high crystallinity polymer. It has been discovered that the agglomeration tendencies of pellets made from low crystallinity polymers may be reduced or eliminated by blending the low crystallinity polymer with at least one high crystallinity polymer incorporating propylene-derived units having high crystallinity. For purposes of this disclosure, a high crystallinity polymer incorporating propylene-derived units means a polymer incorporating at least 94 wt % of propylene derived units and having a melt temperature of at least 100° C. In one or more embodiments of the embodiments described herein, the high crystallinity polymer is an RCP.

In certain embodiments of the processes and blends described herein, solutions of a first low crystallinity polymer and a second high crystallinity polymer are blended via a process which produces the polymers in separate series or parallel polymerization stages. For example, the first low crystallinity polymer may be produced in a first reactor. An effluent from the first reactor, containing a solution of the first polymer, is transferred to a second reactor where a catalyst and monomers necessary to produce the second high crystallinity polymer are contacted, so that a solution of the second polymer is produced in the second reactor and in the presence of the first polymer. This is referred to as a series reactor process.

Both the first polymer and the second polymer may be produced in solution polymerization reactors. Combining the solutions of the polymeric components resulting from these processes provides an intimate blending of the first and second polymers during polymerization of the second copolymer. The blended polymers are then withdrawn from the second reactor and processed into polymer particles, pellets, fibers, films, nonwovens, or other finished articles using conventional processing equipment and techniques.

Alternatively, the first low crystallinity polymer may be produced in the first reactor in parallel with the second high crystallinity polymer produced in the second reactor. In parallel polymerization processes, the first and second polymers are produced in parallel reactors with effluents from each reactor, containing solutions of the respective polymer, directed to a device for blending the effluents to produce a solution of blended polymer components. The blended polymers are then recovered from the solution and processed into polymer particles, pellets, fibers, films, nonwovens, or other finished articles in accordance with conventional process equipment and techniques. In one or more embodiments, the polymer blend formation processes described herein further include the step of forming the elastomeric polymer blends into pellets. In such embodiments, the resulting pellets are free-flowing without being dusted and exhibit storage stability.

More detailed descriptions of both series and parallel processes suitable for production of the polymer blends described herein, including polymerization conditions and suitable catalysts for use therein, are found in U.S. Application Publication No. 2004/0024146 and U.S. Application Publication No. 2006/0183861, both of which are incorporated by reference herein in their entireties.

In alternate embodiments of the embodiments described herein, the first and second polymers may be produced in high pressure solution processes. Such processes, including polymerization conditions and suitable catalysts for use therein, are described in more detail in U.S. Application Publication No. 2009/0163642, which is incorporated by reference herein in its entirety.

In some embodiments of the embodiments described herein, polymer blends of the invention are produced by polymerizing monomers to produce a polymer solution comprising a first polymer in a first reactor, polymerizing monomers to produce a polymer solution comprising a second polymer in a second reactor, combining the first polymer solution with the second polymer solution to produce a polymer blend solution, and processing the polymer blend solution to produce a polymer blend.

The catalyst systems used in the first and second reactors may be the same or different. In one or more embodiments of the embodiments described herein, the catalyst system used in the first reactor to produce the first polymer is different from the catalyst system used in the second reactor to produce the second polymer.

Catalyst Systems Useful for Production of the First and Second Polymers

The first and second polymers described herein are prepared using one or more catalyst systems. As used herein, a "catalyst system" comprises at least a transition metal compound, also referred to as catalyst precursor, and an activator. Contacting the transition metal compound (catalyst precursor) and the activator in solution upstream of the polymerization reactor or in the polymerization reactor of the disclosed processes yields the catalytically active component (catalyst) of the catalyst system. Any given transition metal compound or catalyst precursor can yield a catalytically active component (catalyst) with various activators, affording a wide array of catalysts deployable in the processes of the embodiments described herein. Catalyst systems of the embodiments described herein comprise at least one transition metal compound and at least one activator. However, catalyst systems of the current disclosure may also comprise more than one transition metal compound in combination with one or more activators. Such catalyst systems may optionally include impurity scavengers. Each of these components is described in further detail below.

In one or more embodiments of the embodiments described herein, the catalyst systems used for producing the first and second polymers comprise a metallocene compound. In some embodiments, the metallocene compound is a bridged bisindenyl metallocene having the general formula $(In^1)Y(In^2)MX_2$, where $In^1$ and $In^2$ are identical substituted or unsubstituted indenyl groups bound to M and bridged by Y, Y is a bridging group in which the number of atoms in the direct chain connecting $In^1$ with $In^2$ is from 1 to 8 and the direct chain comprises C or Si, and M is a Group 3, 4, 5, or 6 transition metal. $In^1$ and $In^2$ may be substituted or unsubstituted. If $In_1$ and $In_2$ are substituted by one or more substituents, the substituents are selected from the group consisting of a halogen atom, $C_1$-$C_{10}$ alkyl, $C_5$-$C_{15}$ aryl, $C_6$-$C_{25}$ alkylaryl, and N- or P-containing alkyl or aryl. Exemplary metallocene compounds of this type include, but are not limited to, μ-dimethylsilylbis(indenyl)hafnium dimethyl and μ-dimethylsilylbis(indenyl)zirconium dimethyl.

In other embodiments, the metallocene compound may be a bridged bisindenyl metallocene having the general formula $(In^1)Y(In^2)MX_2$, where $In^1$ and $In^2$ are identical 2,4-substituted indenyl groups bound to M and bridged by Y, Y is a bridging group in which the number of atoms in the direct chain connecting In$^1$ with In$^2$ is from 1 to 8 and the direct chain comprises C or Si, and M is a Group 3, 4, 5, or 6 transition metal. In$^1$ and In$^2$ are substituted in the 2 position by a methyl group and in the 4 position by a substituent selected from the group consisting of $C_5$-$C_{15}$ aryl, $C_6$-$C_{25}$ alkylaryl, and N- or P-containing alkyl or aryl. Exemplary metallocene compounds of this type include, but are not limited to, (μ-dimethylsilyl)bis(2-methyl-4-(3,'5'-di-tert-butylphenyl)indenyl) zirconium dimethyl, (μ-dimethylsilyl)bis(2-methyl-4-(3,'5'-di-tert-butylphenyl)indenyl)hafnium dimethyl, (1-dimethylsilyl)bis(2-methyl-4-naphthylindenyl)zirconium dimethyl, (μ-dimethylsilyl)bis(2-methyl-4-naphthylindenyl)hafnium dimethyl, (μ-dimethylsilyl)bis(2-methyl-4-(N-carbazyl)indenyl)zirconium dimethyl, and (μ-dimethylsilyl)bis(2-methyl-4-(N-carbazyl)indenyl)hafnium dimethyl.

Alternatively, in one or more embodiments of the embodiments described herein, the metallocene compound may correspond to one or more of the formulas disclosed in U.S. Pat. No. 7,601,666. Such metallocene compounds include, but are not limited to, dimethylsilyl bis(2-(methyl)-5,5,8,8-tetramethyl-5,6,7,8-tetrahydrobenz(f)indenyl)hafnium dimethyl, diphenylsilyl bis(2-(methyl)-5,5,8,8-tetramethyl-5,6,7,8-tetrahydrobenz(f)indenyl)hafnium dimethyl, diphenylsilyl bis(5,5,8,8-tetramethyl-5,6,7,8-tetrahydrobenz(f)indenyl)hafnium dimethyl, diphenylsilyl bis(2-(methyl)-5,5,8,8-tetramethyl-5,6,7,8-tetrahydrobenz(f)indenyl)zirconium dichloride, and cyclo-propylsilyl bis(2-(methyl)-5,5,8,8-tetramethyl-5,6,7,8-tetrahydrobenz(f)indenyl)hafnium dimethyl.

In one or more embodiments of the embodiments described herein, the activators of the catalyst systems used to produce the first and second polymers comprise a cationic component. In some embodiments, the cationic component has the formula $[R^1R^2R^3AH]^+$, where A is nitrogen, $R^1$ and $R^2$ are together a —$(CH_2)_a$— group, where a is 3, 4, 5 or 6 and form, together with the nitrogen atom, a 4-, 5-, 6- or 7-membered non-aromatic ring to which, via adjacent ring carbon atoms, optionally one or more aromatic or heteroaromatic rings may be fused, and $R^3$ is $C_1$, $C_2$, $C_3$, $C_4$ or $C_5$ alkyl, or N-methylpyrrolidinium or N-methylpiperidinium. In other embodiments, the cationic component has the formula $[R_nAH]^+$, where A is nitrogen, n is 2 or 3, and all R are identical and are $C_1$-$C_3$ alkyl groups, such as for example trimethylammonium, trimethylanilinium, triethylammonium, dimethylanilinium, or dimethylammonium.

In one or more embodiments of the embodiments described herein, the activators of the catalyst systems used to produce the first and second polymers comprise an anionic component, $[Y]^-$. In some embodiments, the anionic component is a non-coordinating anion (NCA), having the formula $[B(R^4)_4]^-$, where $R^4$ is an aryl group or a substituted aryl group, of which the one or more substituents are identical or different and are selected from the group consisting of alkyl, aryl, a halogen atom, halogenated aryl, and haloalkylaryl groups. In one or more embodiments, the substituents are perhalogenated aryl groups, or perfluorinated aryl groups, including but not limited to perfluorophenyl, perfluoronaphthyl and perfluorobiphenyl.

Together, the cationic and anionic components of the catalysts systems described herein form an activator compound. In one or more embodiments of the embodiments described herein, the activator may be N,N-dimethylanilinium-tetra(perfluorophenyl)borate, N,N-dimethylanilinium-tetra(perfluoronaphthyl)borate, N,N-dimethylanilinium-tetrakis(perfluorobiphenyl)borate, N,N-dimethylanilinium-tetrakis(3,5-bis(trifluoromethyl)phenyl)borate, triphenylcarbenium-tetra(perfluorophenyl)borate, triphenylcarbenium-tetra(perfluoronaphthyl)borate, triphenylcarbenium-tetrakis(perfluorobiphenyl)borate, or triphenylcarbenium-tetrakis(3,5-bis(trifluoromethyl)phenyl)borate.

Any catalyst system resulting from any combination of a metallocene compound, a cationic activator component, and an anionic activator component mentioned in the preceding paragraphs shall be considered to be explicitly disclosed herein and may be used in accordance with the embodiments described herein in the polymerization of one or more olefin monomers. Also, combinations of two different activators can be used with the same or different metallocene(s).

Suitable activators for the processes of the embodiments described herein also include alominoxanes (or alumoxanes) and aluminum alkyls. Without being bound by theory, an alumoxane is typically believed to be an oligomeric aluminum compound represented by the general formula ($R^x$—Al—O)$_n$, which is a cyclic compound, or $R^x(R^x$—Al—O)$_n$ AlR$^x_2$, which is a linear compound. Most commonly, alumoxane is believed to be a mixture of the cyclic and linear compounds. In the general alumoxane formula, $R^x$ is independently a $C_1$-$C_{20}$ alkyl radical, for example, methyl, ethyl, propyl, butyl, pentyl, isomers thereof, and the like, and n is an integer from 1-50. In one or more embodiments, $R^x$ is methyl and n is at least 4. Methyl alumoxane (MAO), as well as modified MAO containing some higher alkyl groups to improve solubility, ethyl alumoxane, iso-butyl alumoxane, and the like are useful for the processes disclosed herein.

Further, the catalyst systems suitable for use in the embodiments described herein may contain, in addition to the transition metal compound and the activator described above, additional activators (co-activators) and/or scavengers. A co-activator is a compound capable of reacting with the transition metal complex, such that when used in combination with an activator, an active catalyst is formed. Co-activators include alumoxanes and aluminum alkyls.

In some embodiments of the invention, scavengers may be used to "clean" the reaction of any poisons that would otherwise react with the catalyst and deactivate it. Typical aluminum or boron alkyl components useful as scavengers are represented by the general formula $R^xJZ_2$ where J is aluminum or boron, $R^x$ is a $C_1$-$C_{20}$ alkyl radical, for example, methyl, ethyl, propyl, butyl, pentyl, and isomers thereof, and each Z is independently $R^x$ or a different univalent anionic ligand such as halogen (Cl, Br, I), alkoxide (OR$^X$) and the like. Exemplary aluminum alkyls include triethylaluminum, diethylaluminum chloride, ethylaluminium dichloride, tri-iso-butylaluminum, tri-n-octylaluminum, tri-n-hexylaluminum, trimethylaluminum and combinations thereof. Exemplary boron alkyls include triethylboron. Scavenging compounds may also be alumoxanes and modified alumoxanes including methylalumoxane and modified methylalumoxane.

In one or more embodiments of the embodiments described herein, the catalyst system used in the first reactor to produce the first polymer is different from the catalyst system used in the second reactor to produce the second polymer. In such embodiments, the catalyst systems used in the first and second reactors have different transition metal components, but may use the same or different activators. Exemplary activators for use in both the first and second reactors include N,N-dimethylanilinium-tetra(perfluorophenyl)borate, N,N-dimethylanilinium-tetra(perfluoronaphthyl)borate, N,N-dimethylanilinium-tetrakis(perfluorobiphenyl)borate, N,N-dimethylanilinium-tetrakis(3,5-bis(trifluoromethyl)phenyl)borate, triphenylcarbenium-tetra(perfluorophenyl)borate, triphenylcarbenium-tetra(perfluoronaphthyl)borate, triphenylcarbenium-tetrakis (perfluorobiphenyl)borate, and triphenylcarbenium-tetrakis(3,5-bis(trifluoromethyl)phenyl)borate.

In some embodiments, the catalyst system used to produce the first polymer comprises a transition metal component which is a bridged bisindenyl metallocene having the general formula $(In^1)Y(In^2)MX_2$, where $In^1$ and $In^2$ are identical substituted or unsubstituted indenyl groups bound to M and bridged by Y, Y is a bridging group in which the number of atoms in the direct chain connecting $In^1$ with $In^2$ is from 1 to 8 and the direct chain comprises C or Si, and M is a Group 3, 4, 5, or 6 transition metal. $In^1$ and $In^2$ may be substituted or unsubstituted. If $In_1$ and $In_2$ are substituted by one or more substituents, the substituents are selected from the group consisting of a halogen atom, $C_1$-$C_{10}$ alkyl, $C_5$-$C_{15}$ aryl, $C_6$-$C_{25}$ alkylaryl, and N- or P-containing alkyl or aryl. In one or more embodiments, the transition metal component used to produce the first polymer is μ-dimethylsilylbis(indenyl) hafnium dimethyl.

In some embodiments, the catalyst system used to produce the second polymer comprises a transition metal component which is a bridged bisindenyl metallocene having the general formula $(In^1)Y(In^2)MX_2$, where $In^1$ and $In^2$ are identical 2,4-substituted indenyl groups bound to M and bridged by Y, Y is a bridging group in which the number of atoms in the direct chain connecting $In^1$ with $In^2$ is from 1 to 8 and the direct chain comprises C or Si, and M is a Group 3, 4, 5, or 6 transition metal. $In^1$ and $In^2$ are substituted in the 2 position by a methyl group and in the 4 position by a substituent selected from the group consisting of $C_5$-$C_{15}$ aryl, $C_6$-$C_{25}$ alkylaryl, and N- or P-containing alkyl or aryl. In one or more embodiments, the transition metal component used to produce the first polymer is (μ-dimethylsilyl)bis(2-methyl-4-(3,'5'-di-tert-butylphenyl)indenyl)zirconium dimethyl, (μ-dimethylsilyl)bis(2-methyl-4-(3,'5'-di-tert-butylphenyl)indenyl) hafnium dimethyl, (μ-dimethylsilyl)bis(2-methyl-4-naphthylindenyl)zirconium dimethyl, (μ-dimethylsilyl)bis(2-methyl-4-naphthylindenyl)hafnium dimethyl, (μ-dimethylsilyl)bis(2-methyl-4-(N-carbazyl)indenyl)zirconium dimethyl, or (μ-dimethylsilyl)bis(2-methyl-4-(N-carbazyl)indenyl)hafnium dimethyl.

In one or more embodiments of the embodiments described herein, the first polymer is polymerized in the first reactor using a catalyst system comprising μ-dimethylsilylbis(indenyl)hafnium dimethyl and either N,N-dimethylanilinium-tetra(perfluoronaphthyl)borate or N,N-dimethylanilinium-tetra(perfluorophenyl)borate, and the second polymer is polymerized in the second reactor using a catalyst system comprising (μ-dimethylsilyl)bis(2-methyl-4-(3',5'-di-tert-butylphenyl)indenyl)zirconium dimethyl and either N,N-dimethylanilinium-tetra(perfluoronaphthyl)borate or N,N-dimethylanilinium-tetra(perfluorophenyl)borate.

Properties of the Polymer Blend

In certain embodiments of the embodiments described herein, the polymer blends produced by the dual reactor process described above may incorporate, in neat form, from about 70 wt % to about 98 wt %, or from about 75 wt % to about 95 wt %, or from about 80 wt % to about 93 wt %, or from about 82 wt % to about 92 wt %, or from about 85 wt % to about 90 wt % of the first polymer and from about 2 wt % to about 30 wt %, or from about 5 wt % to about 25 wt %, or from about 7 wt % to about 20 wt %, or from about 8 wt % to about 18 wt %, or from about 10 wt % to about 15 wt % of the second polymer. In another embodiment, in neat form, the polymer blends described herein incorporate from about 80 wt % to about 95 wt % of the first polymer and from about 5 wt % to about 20 wt % of the second polymer. In other embodiments, in neat form, the polymer blends described herein incorporate from about 82 wt % to about 90 wt % of the first polymer and from about 10 wt % to about 18 wt % of the second polymer.

In further embodiments of the invention, the polymer blends may comprise an overall ethylene content of from about 3 wt % to about 30 wt %, or from about 5 wt % to about 25 wt %, or from about 10 wt % to about 25 wt %, or from about 12 wt % to about 18 wt %, or from about 13 wt % to about 18 wt % ethylene.

In some embodiments, the polymer blends described herein may have a melt flow rate (MFR, 2.16 kg weight @ 230° C.) of from about 0.1 to about 15 g/10 min, as measured according to the ASTM D-1238(A) test method. In further embodiments, the MFR of the blend is from about 1.0 to about 7 g/10 min, or from about 2 to about 6 g/10 min.

In other embodiments, the polymer blends described herein may have a melt flow rate (MFR, 2.16 kg weight @ 230° C.) of from about 6 to about 100 g/10 min, as measured according to the ASTM D-1238(A) test method. In further embodiments, the MFR of the blend is from about 10 to about 50 g/10 min, or from about 15 to about 25 g/10 min.

In some embodiments, the polymer blends may have an Mn of from about 10,000 to about 200,000 g/mole, or from about 20,000 to about 150,000, or from about 30,000 to about 100,000. In the same or other embodiments, the polymer blends may have an Mw of from about 100,000 to about 400,000 g/mole, or from about 150,000 to about 300,000, or from about 200,000 to about 250,000.

The polymer blends may also have an MWD of from about 1.5 to about 10, or from about 1.9 to about 5.0. In addition, the polymer blends may have a g' of from about 0.94 to about 1.0, or from about 0.95 to about 0.98.

The polymer blends described herein may, in some embodiments, have a melting point greater than about 100° C., or greater than about 110° C., or greater than about 115° C., or greater than about 120° C. In the same or other embodiments, the polymer blends may have a melting point between about 110° C. and about 145° C., or between about 115° C. and about 140° C., or between about 120° C. and about 135° C. In addition, the Hf of the polymer blends may be less than about 45 J/g, or less than about 40 J/g, or less than about 35 J/g, or less than about 30 J/g, or less than about 25 J/g, or less than about 20 J/g.

In some embodiments of the embodiments described herein, the polymer blend may have a Vicat softening point greater than about 45° C. The Vicat softening point of a polymer is determined according to ASTM D1525. In further embodiments, the Vicat softening point of the polymer blend is greater than about 55° C., or greater than about 65° C., or greater than about 70° C., or greater than about 75° C.

In some embodiments of the embodiments described herein, the polymer blends may have a tensile stress at 300% strain (300% modulus) of less than 600 psi (4137 kPa), or less than 500 psi (3447 kPa), or less than 400 psi (2758 kPa), as determined by a stress strain test according to ASTM D412. In the same or other embodiments, the polymer blends may have a tension set of less than 15%, or less than 12%, or less than 10%, as determined by ASTM D790. In the same or other embodiments, the polymer blends may have a 1% secant modulus of greater than 2000 kpsi (13790 kPa), or greater than 2200 kpsi (15169 kPa), or greater than 2500 kpsi (17237 kPa), or greater than 3000 kpsi (20684 kPa), as determined by ASTM D790-A (0.05'/min).

In some embodiments of the embodiments described herein, the polymer blends have a Shore A Hardness measurement greater than about 50, or greater than about 60, or greater than about 65, or greater than about 70. Shore A Hardness is determined according to ASTM D2240. In the same or other embodiments, pellets formed from the polymer blends have an average maximum force for pellet separation of less than about 10 N, or less than about 7 N, or less than about 5 N, or less than about 2 N in an accelerated storage stability test. The procedure for the accelerated storage stability test is as follows: 35 grams of polymer pellets are placed in a 50 cc glass beaker (40 mm diameter) with a thin film of Mylar between the glass and the pellets to avoid direct contact with glass. A weight (1160 grams) is placed on top of the pellets, with a thin film of Tygaflor between the weight and the pellets to avoid direct contact between the pellets and the weight. The beaker is then stored in an oven at 50° C. for 7 days. The beaker is taken out of the oven and allowed to cool to room temperature. At the end of the oven test, pellets are free flowing or may be aggregated or agglomerated. When some level of aggregation or agglomeration is observed, the cylinder of aggregated or agglomerated pellets is placed between two parallel plates in a tensile tester with the cylinder being placed parallel to the plates. The two plates are moved in a compression mode at a speed of 50 mm/min and the force to break the aggregated or agglomerated pellets is measured. These tests are performed in duplicate and the average of the two values is reported. Aggregated pellets are free flowing as individual pellets at the end of the test, while agglomerated pellets break into larger chunks of agglomerated pellets which cannot be deagglomerated.

In one or more embodiments of the embodiments described herein, the polymer blends may be characterized by having two or more of the following properties: an overall propylene content of between about 75 wt % and about 90 wt %, a melting point between about 110° C. and about 145° C., a Vicat softening point greater than about 45° C., a tensile stress at 300% strain of less than about 500 psi (3447 kPa), as determined by a stress strain test according to ASTM D412, or an average maximum force for pellet separation of less than about 10 N in an accelerated storage stability test.

Polymer pellets made from the polymer blends of the embodiments described herein exhibit exceptional pellet stability, without altering or negatively impacting mechanical characteristics of the polymer which are desired for end use applications, such as strength and elasticity. Pellet stability includes the ability of the polymer pellets to be free-flowing during shipping, handling, and storage. Further, polymer pellets made according to the processes described herein maintain their free-flowing characteristics while minimizing or eliminating the need for dusting of the pellets. Without wishing to be bound by theory, it is believed that using different catalyst systems for preparation of the first and second polymers as described above results in a lower concentration of stereo and regio defects in the second polymer as compared to blends in which the first and second polymers are prepared using the same catalyst system. The lower level of defects in the second polymer results in the second polymer, and therefore the polymer blend, having a higher melting point, higher modulus, and thicker polymer crystals (leading to an increased melting point at equal crystallinity) than blends in which the first and second polymers are prepared using the same catalyst system. All of these factors combine to result in polymer pellets with improved structural integrity and pellet stability.

EXAMPLES

The foregoing discussion can be further described with reference to the following non-limiting examples.

Examples 1-5

Polymer blends according to the invention and comprising a first polymer and a second polymer were prepared using a variety of catalyst systems, and the properties of the second polymer were determined. For all of the blends, the first polymer was a propylene-ethylene copolymer prepared using a catalyst system comprising dimethylsilyl bis(indenyl) hafnium dimethyl and dimethyl anilinium tetrakis(heptafluoronaphthyl) borate. The second polymer was a propylene-ethylene RCP prepared using catalyst systems as follows:

Example 1

(µ-dimethylsilyl)bis(2-methyl-4-naphthylindenyl)zirconium dimethyl precursor with N,N-dimethylanilinium-tetra(perfluorophenyl)borate activator.

Example 2

(µ-dimethylsilyl)bis(2-methyl-4-naphthylindenyl)zirconium dimethyl precursor with N,N-dimethylanilinium-tetra(perfluoronaphthyl)borate activator.

Example 3

(µ-dimethylsilyl)bis(2-methyl-4-(3',5'-di-tert-butylphenyl) indenyl)zirconium dimethyl precursor with N,N-dimethylanilinium-tetra(perfluorophenyl)borate activator.

Example 4

(µ-dimethylsilyl)bis(2-methyl-4-(3',5'-di-tert-butylphenyl) indenyl)zirconium dimethyl precursor with N,N-dimethylanilinium-tetra(perfluoronaphthyl)borate activator.

Example 5

µ-dimethylsilylbis(indenyl)hafnium dimethyl precursor with N,N-dimethylanilinium-tetra(perfluoronaphthyl)borate activator.

FIG. 1 depicts the peak melting point of the second polymers as a function of ethylene concentration. As shown in FIG. 1, the second polymer components of Examples 1 through 4, which were prepared using different catalyst systems from the first polymer, exhibit higher melting peak temperatures at equal ethylene concentrations than that of Example 5, which was prepared using the same catalyst system as the first polymer.

Examples 6-11

Polymer blends were produced in a dual reactor process similar to those set forth above. The first polymer, a propylene-ethylene copolymer, was prepared in the first reactor using a catalyst system comprising µ-dimethylsilylbis(indenyl)hafnium dimethyl and N,N-dimethylanilinium-tetra(perfluoronaphthyl)borate. For Examples 6-10, the second polymer, a propylene-ethylene RCP, was produced in the second reactor using a catalyst system comprising (µ-dimethylsilyl) bis(2-methyl-4-(3',5'-di-tert-butylphenyl)indenyl)zirconium dimethyl and N,N-dimethylanilinium-tetra(perfluoronaphthyl)borate. For Example 11 (comparative), the second polymer, also a propylene-ethylene RCP, was produced in the second reactor using the same catalyst system as the first polymer. Characteristics of the first polymers, the second polymers, and the resulting polymer blends for each of Examples 6-11 are shown in Table 1.

blends having desirable strength and elastic properties along with improved pellet stability characteristics when compared with similar polymer blends known in the art.

These improved pellet stability characteristics were confirmed via a storage stability test. The test was performed as follows. For each of Examples 6 through 11, two polymer

TABLE 1

| | \multicolumn{6}{c}{Example No.} |
|---|---|---|---|---|---|---|
| | 6 | 7 | 8 | 9 | 10 | 11 (Comp.) |
| \multicolumn{7}{c}{First Polymer} |
| MFR, g/10 min (2.16 kg @ 230° C.) | 2.87 | 3.02 | 2.97 | 2.86 | 3.1 | — |
| % Ethylene (wt %) | 16.54 | 15.84 | 16.23 | 17.36 | 17.23 | 17.3 |
| \multicolumn{7}{c}{Second Polymer} |
| MFR, g/10 min (2.16 kg @ 230° C.) | 1.0 | 528 | 64 | 1565 | 1400 | 8.0 |
| % Ethylene (wt %) | 3.9 | 4.7 | 4.6 | 5.0 | 4.8 | — |
| \multicolumn{7}{c}{Polymer Blend} |
| MFR, g/10 min (2.16 kg @ 230° C.) | 2.9 | 4.3 | 4.4 | 4.8 | 4.7 | 2.9 |
| % Ethylene (wt %) | 14.8 | 14.2 | 13.8 | 15.2 | 15.6 | 15.8 |
| Mw (det. by GPC w/ LALLS) | 244,090 | 213,460 | 218,380 | 208,560 | 211,010 | 225,162 |
| Tm, ° C. | 130.0 | 124.0 | 124.7 | 121.7 | 123.2 | 98.0 |
| Hf, J/g | 8.5 | 11.1 | 12.4 | 11.8 | 11.1 | 12.0 |
| % Second Polymer (wt %) | 10.5 | 14.8 | 16.4 | 16.2 | 15.0 | 10.0 |

The mechanical properties of the polymer blends of Examples 6 through 11 were tested, and the results are reported in Table 2.

samples were prepared. One sample from each Example was dusted with 0.25% HA 2454 Coathylene LDPE dust, available from DuPont, while one sample was left undusted. The

TABLE 2

| | \multicolumn{6}{c}{Example No.} |
|---|---|---|---|---|---|---|
| | 6 | 7 | 8 | 9 | 10 | 11 (Comp.) |
| \multicolumn{7}{c}{Tensile Properties (Type IV, 20"/min)} |
| Stress @ yield (psi) | no yield | no yield | no yield | no yield | no yield | no yield |
| Strain @ yield (%) | no yield | no yield | no yield | no yield | no yield | no yield |
| Stress @ break (psi) | no break | no break | no break | no break | no break | 2017 |
| Strain @ yield (%) | no break | no break | no break | no break | no break | 861 |
| \multicolumn{7}{c}{Flexural Modulus} |
| Tangent Mod. (kpsi), 0.05'/min | 2714 | — | — | 4764 | 2076 | — |
| 1% Secant Mod. (kpsi), 0.05'/min | 2065 | 3214 | 3216 | 4304 | 2392 | 1650 |
| 100% Modulus (psi) [kPa] | 297.2 [2049] | 392.3 [2705] | 403.2 [2780] | 446.3 [3077] | 340.5 [2348] | 308.3 [2126] |
| 200% Modulus (psi) [kPa] | 311.6 [2148] | 417.8 [2881] | 423.4 [2919] | 463.4 [3195] | 355.0 [2448] | — |
| 300% Modulus (psi) [kPa] | 343.3 [2367] | 444.9 [3067] | 455.0 [3137] | 488.5 [3368] | 380.2 [2621] | 387.7 [2673] |
| Hardness (Shore A) | 66.7 | 74.3 | 74.7 | 79.0 | 70.0 | 67.0 |
| Vicat (° C.), 200 g | 48.0 | 72.7 | 75.7 | 76.2 | 72.1 | 59.0 |
| Permanent Set (%), $1^{st}$ elong. | 18.3 | — | — | — | — | 21.7 |
| Permanent Set (%), $2^{nd}$ elong. | 7.6 | — | — | — | — | 9.2 |

As shown in Table 2, the polymer blends according to the invention (Examples 6-10) are generally soft polymers with higher melting temperatures, higher Vicat softening temperatures, and similar elastic properties (permanent set, 100% modulus, 200% modulus, 300% modulus) when compared to the comparative polymer blend of Example 11. Further, the 1% secant modulus of the inventive polymer blends is also somewhat higher. All of these properties lead to polymer samples were stored according to the previously described storage stability test method. At the end of the aging period, each sample was observed visually. For all samples except the undusted sample from Example 11 (the comparative polymer), the polymer pellets remained fully separated at the end of the aging period. Further testing was conducted on the undusted Example 11 sample, and the average maximum force required to achieve full separation of the pellets was 5.5 N.

For purposes of convenience, various specific test procedures are identified above for determining certain properties such as tension set, flexural modulus, Vicat softening temperature, Shore A Hardness, etc. However, when a person of ordinary skill reads this patent and wishes to determine whether a composition or polymer has a particular property identified in a claim, then any published or well-recognized method or test procedure can be followed to determine that property, although the specifically identified procedure is preferred. Each claim should be construed to cover the results of any of such procedures, even to the extent different procedures can yield different results or measurements. Thus, a person of ordinary skill in the art is to expect experimental variations in measured properties that are reflected in the claims. All numerical values can be considered to be "about" or "approximately" the stated value, in view of the nature of testing in general.

Having described the various aspects of the compositions herein, further specific embodiments of the invention include those set forth in the following lettered paragraphs:

A. An elastomeric polymer composition comprising a polymer blend comprising a first polymer and a second polymer, wherein the first polymer comprises from about 70 to about 90 wt % units derived from propylene and from about 10 wt % to about 30 wt % units derived from ethylene and/or a $C_4$-$C_{10}$ alpha-olefin; the second polymer comprises from about 88 wt % to about 98 wt % units derived from propylene and from about 2 wt % to about 12 wt % units derived from ethylene and/or a $C_4$-$C_{10}$ alpha-olefin; and the elastomeric polymer composition is characterized by two or more of the following properties: (i.) an overall propylene content of between about 75 wt % and about 90 wt %; (ii.) a melting point between about 110° C. and about 145° C.; (iii.) a Vicat softening point greater than about 45° C.; (iv.) a tensile stress at 300% strain of less than about 500 psi (3447 kPa), as determined by a stress strain test according to ASTM D412; or (v.) an average maximum force for pellet separation of less than about 10 N in an accelerated storage stability test.

B. The elastomeric polymer composition of paragraph A, wherein the polymer composition comprises from about 5 wt % to about 20 wt % of the second polymer.

C. The elastomeric polymer composition of any of preceding paragraphs, wherein the polymer composition comprises from about 10 wt % to about 18 wt % of the second polymer.

D. The elastomeric polymer composition of any of the preceding paragraphs, wherein the polymer composition has a Vicat softening point greater than about 65° C.

E. The elastomeric polymer composition of any of the preceding paragraphs, wherein the polymer composition has a Vicat softening point greater than about 70° C.

F. The elastomeric polymer composition of any of the preceding paragraphs, wherein the polymer composition has a tension set value of less than 12%.

G. The elastomeric polymer composition of any of the preceding paragraphs, wherein the polymer composition has a tensile stress at 300% strain of less than 400 psi (2758 kPa), as determined by a stress strain test according to ASTM D412.

H. The elastomeric polymer composition of any of the preceding paragraphs, wherein the polymer composition comprises from about 12 wt % to about 20 wt % ethylene.

I. A process for the production of an elastomeric polymer composition comprising: polymerizing monomers to produce a polymer solution comprising a first polymer in a first reactor; polymerizing monomers to produce a polymer solution comprising a second polymer in a second reactor; combining the first polymer solution with the second polymer solution to produce a polymer blend solution; and processing the polymer blend solution to produce an elastomeric polymer composition; wherein the first polymer comprises from about 70 wt % to about 90 wt % units derived from propylene and from about 10 wt % to about 30 wt % units derived from ethylene and/or a $C_4$-$C_{10}$ alpha-olefin, and the second polymer comprises from about 88 to about 98 wt % units derived from propylene and from about 2 wt % to about 12 wt % units derived from ethylene and/or a $C_4$-$C_{10}$ alpha-olefin; and wherein the elastomeric polymer composition is characterized by two or more of the following properties: an overall propylene content of between about 75 wt % and about 90 wt %, a melting point between about 110° C. and about 145° C., a Vicat softening point greater than about 45° C., a tensile stress at 300% strain of less than about 500 psi (3447 kPa) (as determined by a stress strain test according to ASTM D412), or an average maximum force for pellet separation of less than about 10 N in an accelerated storage stability test.

J. The process of paragraph I, wherein the polymer composition comprises from about 5 wt % to about 20 wt % of the second polymer.

K. The process of any of paragraphs I-J, wherein the polymer composition comprises from about 10 wt % to about 18 wt % of the second polymer.

L. The process of any of paragraphs I-K, wherein the polymer composition has a Vicat softening point greater than about 65° C.

M. The process of any of paragraphs I-L, wherein the polymer composition has a Vicat softening point greater than about 70° C.

N. The process of any of paragraphs I-M, wherein the polymer composition has a tension set value of less than about 12%.

O. The process of any of paragraphs I-N, wherein the polymer composition has a tensile stress at 300% strain of less than about 400 psi (2758 kPa), as determined by a stress strain test according to ASTM D412.

P. The process of any of paragraphs I-O, wherein the first polymer is polymerized in the first reactor using a catalyst system comprising a transition metal compound and an activator, wherein the transition metal compound is a bridged bisindenyl metallocene having the general formula $(In^1)Y(In^2)MX_2$, where $In^1$ and $In^2$ are identical unsubstituted or substituted indenyl groups bound to M and bridged by Y, Y is a bridging group in which the number of atoms in the direct chain connecting $In^1$ with $In^2$ is from 1 to 8 and the direct chain comprises C or Si, and M is a Group 3, 4, 5, or 6 transition metal; and where if $In^1$ and $In^2$ are substituted by one or more substituents, the substituents are selected from the group consisting of a halogen atom, $C_1$-$C_{10}$ alkyl, $C_5$-$C_{15}$ aryl, $C_6$-$C_{25}$ alkylaryl, and N- or P-containing alkyl or aryl; and the activator is N,N-dimethylanilinium-tetra(perfluorophenyl)borate, N,N-dimethylanilinium-tetra(perfluoronaphthyl)borate, N,N-dimethylanilinium-tetrakis(perfluorobiphenyl)borate, N,N-dimethylanilinium-tetrakis(3,5-bis(trifluoromethyl)phenyl)borate, triphenylcarbenium-tetra(perfluorophenyl)borate, triphenylcarbenium-tetra(perfluoronaphthyl)borate, triphenylcarbenium-tetrakis(perfluorobiphenyl)borate, or triphenylcarbenium-tetrakis(3,5-bis(trifluoromethyl)phenyl)borate.

Q. The process of any of paragraphs I-P, wherein the second polymer is polymerized in the second reactor using a catalyst system comprising a transition metal compound and an activator, wherein the transition metal compound is a bridged bisindenyl metallocene having the general formula $(In^1)Y(In^2)MX_2$, where $In^1$ and $In^2$ are identical 2,4-substituted indenyl groups bound to M and bridged by Y, Y is a bridging group in which the number of atoms in the direct chain connecting $In^1$ with $In^2$ is from 1 to 8 and the direct chain comprises C or Si, and M is a Group 3, 4, 5, or 6 transition metal; and where $In^1$ and $In^2$ are substituted in the 2 position by a methyl group and in the 4 position by a substituent selected from the group consisting of $C_5$-$C_{15}$ aryl, $C_6$-$C_{25}$ alkylaryl, and N- or P-containing alkyl or aryl; and the activator is N,N-dimethylanilinium-tetra(perfluorophenyl)borate, N,N-dimethylanilinium-tetra(perfluoronaphthyl)borate, N,N-dimethylanilinium-tetrakis(perfluorobiphenyl)borate, N,N-dimethylanilinium-tetrakis(3,5-bis(trifluoromethyl) phenyl)borate, triphenylcarbenium-tetra(perfluorophenyl) borate, triphenylcarbenium-tetra(perfluoronaphthyl)borate, triphenylcarbenium-tetrakis(perfluorobiphenyl)borate, or triphenylcarbenium-tetrakis(3,5-bis(trifluoromethyl)phenyl) borate.

R. The process of any of paragraphs I-Q, wherein the first polymer is polymerized in the first reactor using a catalyst system comprising μ-dimethylsilylbis(indenyl)hafnium dimethyl and either N,N-dimethylanilinium tetra(perfluorophenyl)borate or N,N-dimethylanilinium tetra(perfluoronaphthyl)borate; and the second polymer is polymerized in the second reactor using a catalyst system comprising a transition metal compound selected from (μ-dimethylsilyl)bis(2-methyl-4-(3',5'-di-tert-butylphenyl)indenyl)zirconium dimethyl, (μ-dimethylsilyl)bis(2-methyl-4-(3',5'-di-tert-butylphenyl)indenyl)hafnium dimethyl, (μ-dimethylsilyl)bis(2-methyl-4-naphthylindenyl)zirconium dimethyl, (μ-dimethylsilyl)bis(2-methyl-4-naphthylindenyl)hafnium dimethyl, (μ-dimethylsilyl)bis(2-methyl-4-(N-carbazyl)indenyl)zirconium dimethyl, or (μ-dimethylsilyl)bis(2-methyl-4-(N-carbazyl)indenyl)hafnium dimethyl, and an activator compound selected from N,N-dimethylanilinium tetra(perfluorophenyl)borate or N,N-dimethylanilinium tetra(perfluoronaphthyl)borate.

S. The process of any of paragraphs I-R, further comprising the step of forming the elastomeric polymer composition into pellets, wherein the pellets are free-flowing without being dusted.

T. The process of any of paragraphs I-S, further comprising the step of forming the elastomeric polymer composition into pellets, wherein the pellets exhibit storage stability.

U. One or more polymer pellets comprising the elastomeric polymer composition of any of paragraphs A-H.

V. The polymer pellets of paragraph U, wherein the pellets are free flowing without being dusted and exhibit storage stability.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the embodiments described herein, other and further embodiments of the invention may be devised without departing from the basic scope thereof, and the scope thereof is determined by the claims that follow.

What is claimed:

1. An elastomeric polymer composition comprising a polymer blend comprising a first polymer and a second polymer, wherein:
   a. the first polymer comprises from about 70 wt % to about 90 wt % units derived from propylene and from about 10 wt % to about 30 wt % units derived from ethylene and/or a $C_4$-$C_{10}$ alpha-olefin;
   b. the second polymer comprises from about 88 wt % to about 98 wt % units derived from propylene and from about 2 wt % to about 12 wt % units derived from ethylene and/or a $C_4$-$C_{10}$ alpha-olefin; and
   c. the elastomeric polymer composition is characterized by two or more of the following properties:
      i. an overall propylene content of between about 75 wt % and about 90 wt %;
      ii. a melting point between about 110° C. and about 145° C.;
      iii. a Vicat softening point greater than about 45° C.;
      iv. a tensile stress at 300% strain of less than about 500 psi (3447 kPa), as determined by a stress strain test according to ASTM D412; or
      v. an average maximum force for pellet separation of less than about 10 N in an accelerated storage stability test,
      wherein the polymer composition has at least one of (i) a tension set value of less than 12%, and/or (ii) a tensile stress at 300% strain of less than about 400 psi (2758 kPa), as determined by a stress strain test according to ASTM D412.

2. The elastomeric polymer composition of claim 1, wherein the polymer composition comprises from about 5 wt % to about 20 wt % of the second polymer.

3. The elastomeric polymer composition of claim 2, wherein the polymer composition comprises from about 10 wt % to about 18 wt % of the second polymer.

4. The elastomeric polymer composition of claim 1, wherein the polymer composition has a Vicat softening point greater than about 65° C.

5. The elastomeric polymer composition of claim 4, wherein the polymer composition has a Vicat softening point greater than about 70° C.

6. The elastomeric polymer composition of claim 1, wherein the polymer composition comprises from about 12 wt % to about 20 wt % ethylene.

7. A process for the production of an elastomeric polymer composition comprising:
   a. polymerizing monomers to produce a polymer solution comprising a first polymer in a first reactor;
   b. polymerizing monomers to produce a polymer solution comprising a second polymer in a second reactor;
   c. combining the first polymer solution with the second polymer solution to produce a polymer blend solution; and
   d. processing the polymer blend solution to produce an elastomeric polymer composition,
   wherein the first polymer comprises from about 70 wt % to about 90 wt % units derived from propylene and from about 10 wt % to about 30 wt % units derived from ethylene and/or a $C_4$-$C_{10}$ alpha-olefin, and the second polymer comprises from about 88 wt % to about 98 wt % units derived from propylene and from about 2 wt % to about 12 wt % units derived from ethylene and/or a $C_4$-$C_{10}$ alpha-olefin; and wherein the elastomeric polymer composition is characterized by two or more of the following properties: an overall propylene content of between about 75 wt % and about 90 wt %, a melting point between about 110° C. and about 145° C., a Vicat softening point greater than about 45° C., a tensile stress at 300% strain of less than about 500 psi (3447 kPa) (as determined by a stress strain test according to ASTM D412), or an average maximum force for pellet separation of less than about 10 N in an accelerated storage stability test, wherein the polymer composition has at least one of (i) a tension set value of less than about 12%, and/or (ii) a tensile stress at 300% strain of less than about 400 psi (2758 kPa), as determined by a stress strain test according to ASTM D412.

8. The process of claim 7, wherein the polymer composition comprises from about 5 wt % to about 20 wt % of the second polymer.

9. The process of claim 8, wherein the polymer composition comprises from about 10 wt % to about 18 wt % of the second polymer.

10. The process of claim 7, wherein the polymer composition has a Vicat softening point greater than about 65° C.

11. The process of claim 7, wherein the polymer composition has a Vicat softening point greater than about 70° C.

12. The process of claim 7, wherein the first polymer is polymerized in the first reactor using a catalyst system comprising a transition metal compound and an activator, wherein:
  a. the transition metal compound is a bridged bisindenyl metallocene having the general formula $(In^1)Y(In^2)MX_2$, where $In^1$ and $In^2$ are identical unsubstituted or substituted indenyl groups bound to M and bridged by Y, Y is a bridging group in which the number of atoms in the direct chain connecting $In^1$ with $In^2$ is from 1 to 8 and the direct chain comprises C or Si, and M is a Group 3, 4, 5, or 6 transition metal; and where if $In^1$ and $In^2$ are substituted by one or more substituents, the substituents are selected from the group consisting of a halogen atom, $C_1$-$C_{10}$ alkyl, $C_5$-$C_{15}$ aryl, $C_6$-$C_{25}$ alkylaryl, and N- or P-containing alkyl or aryl; and
  b. the activator is N,N-dimethylanilinium-tetra(perfluorophenyl)borate, N,N-dimethylanilinium-tetra(perfluoronaphthyl)borate, N,N-dimethylanilinium-tetrakis(perfluorobiphenyl)borate, N,N-dimethylanilinium-tetrakis(3,5-bis(trifluoromethyl)phenyl)borate, triphenylcarbenium-tetra(perfluorophenyl)borate, triphenylcarbenium-tetra(perfluoronaphthyl)borate, triphenylcarbenium-tetrakis(perfluorobiphenyl)borate, or triphenylcarbenium-tetrakis(3,5-bis(trifluoromethyl)phenyl)borate.

13. The process of claim 7, wherein the second polymer is polymerized in the second reactor using a catalyst system comprising a transition metal compound and an activator, wherein:
  a. the transition metal compound is a bridged bisindenyl metallocene having the general formula $(In^1)Y(In^2)MX_2$, where $In^1$ and $In^2$ are identical 2,4- substituted indenyl groups bound to M and bridged by Y, Y is a bridging group in which the number of atoms in the direct chain connecting $In^1$ with $In^2$ is from 1 to 8 and the direct chain comprises C or Si, and M is a Group 3, 4, 5, or 6 transition metal; and where $In^1$ and $In^2$ are substituted in the 2 position by a methyl group and in the 4 position by a substituent selected from the group consisting of $C_5$-$C_{15}$ aryl, $C_6$-$C_{25}$ alkylaryl, and N- or P-containing alkyl or aryl; and
  b. the activator is N,N-dimethylanilinium-tetra(perfluorophenyl)borate, N,N-dimethylanilinium-tetra(perfluoronaphthyl)borate, N,N-dimethylanilinium-tetrakis(perfluorobiphenyl)borate, N,N-dimethylanilinium-tetrakis(3,5-bis(trifluoromethyl)phenyl)borate, triphenylcarbenium-tetra(perfluorophenyl)borate, triphenylcarbenium-tetra(perfluoronaphthyl)borate, triphenylcarbenium-tetrakis(perfluorobiphenyl)borate, or triphenylcarbenium-tetrakis(3,5-bis(trifluoromethyl)phenyl)borate.

14. The process of claim 7, wherein:
  a. the first polymer is polymerized in the first reactor using a catalyst system comprising μ-dimethylsilylbis(indenyl)hafnium dimethyl and either N,N-dimethylanilinium tetra(perfluorophenyl)borate or N,N-dimethylanilinium tetra(perfluoronaphthyl)borate; and
  b. the second polymer is polymerized in the second reactor using a catalyst system comprising a transition metal compound selected from (μ-dimethylsilyl)bis(2-methyl-4-(3',5'-di-tert-butylphenyl)indenyl)zirconium dimethyl, (μdimethylsilyl)bis(2-methyl-4-(3',5'-di-tert-butylphenyl)indenyl)hafnium dimethyl, (μ-dimethylsilyl)bis(2-methyl-4-naphthylindenyl)zirconium dimethyl, (μdimethylsilyl)bis(2-methyl-4-naphthylindenyl)hafnium dimethyl, (μdimethylsilyl)bis(2-methyl-4-(N-carbazyl)indenyl)zirconium dimethyl, or (μdimethylsilyl)bis(2-methyl-4-(N-carbazyl)indenyl)hafnium dimethyl, and an activator compound selected from N,N-dimethylanilinium tetra(perfluorophenyl)borate or N,N-dimethylanilinium tetra(perfluoronaphthyl)borate.

15. The process of claim 7, further comprising the step of forming the elastomeric polymer composition into pellets, wherein the pellets are free-flowing without being dusted.

16. The process of claim 14, further comprising the step of forming the elastomeric polymer composition into pellets, wherein the pellets are free-flowing without being dusted.

17. The process of claim 7, further comprising the step of forming the elastomeric polymer composition into pellets, wherein the pellets exhibit storage stability.

18. The process of claim 14, further comprising the step of forming the elastomeric polymer composition into pellets, wherein the pellets exhibit storage stability.

19. One or more polymer pellets comprising the elastomeric polymer composition of claim 1.

20. The polymer pellets of claim 19, wherein the pellets are free flowing without being dusted and exhibit storage stability.

* * * * *